United States Patent [19]

Gyori

[11] 4,068,943
[45] Jan. 17, 1978

[54] ADDITIVE COLOR PRINTER CONTROL

[75] Inventor: Robert Paul Gyori, Studio City, Calif.

[73] Assignee: De luxe General, Incorporated, Hollywood, Calif.

[21] Appl. No.: 715,610

[22] Filed: Aug. 18, 1976

[51] Int. Cl.² .................. G03B 27/78; G03B 27/32
[52] U.S. Cl. ............................. 355/38; 355/77
[58] Field of Search ............. 355/71, 77, 67, 68, 355/32, 35, 38

[56] References Cited

U.S. PATENT DOCUMENTS

| | | | |
|---|---|---|---|
| 3,120,782 | 2/1964 | Goddard et al. | 355/38 X |
| 3,124,036 | 3/1964 | Hell et al. | 355/77 X |
| 3,519,347 | 7/1970 | Bowker et al. | 355/38 X |
| 3,575,508 | 4/1971 | Fergg et al. | 355/38 X |
| 3,674,364 | 7/1972 | Korman | 355/38 |
| 3,724,947 | 4/1973 | Paulus | 355/38 |

*Primary Examiner*—Donald A. Griffin
*Attorney, Agent, or Firm*—Harry R. Lubcke

[57] ABSTRACT

An automatic electronic control including a microprocessor for retaining additive color printing information, means to reproduce selected such information as electrical control signals, and an optoelectronic feedback loop that includes light sources for additive printing. The control system provides color component control according to the microprocessor color information regardless of other variations and conditions within the system.

6 Claims, 2 Drawing Figures

ADDITIVE COLOR PRINTER CONTROL

BACKGROUND OF THE INVENTION

This invention pertains to precision additive color photographic printing.

While a major portion of color photographs are now printed by the subtractive color system, the difficulty of exercising adequate control over the color rendition in the print is well known. In practice the exercise of human judgement and experience are required to produce acceptable prints.

The prior art has concerned itself with some sort of control that identifies or rejects color negatives that are poorly exposed and so would not allow satisfactory prints to be produced regardless of color correction, and to provide a satisfactory color balance in spite of "large area transmission densities" (LATD). In the latter case the abnormally large contribution of a wide expanse of colored blue sky, or of any other primary color, is minimized so that otherwise required color balance information is made available for the printing of the negative. This phenomenon has also been termed "subject failure."

One proposal of the prior art arranges for a visual inspection by the operator to discern "subject failure" negatives, and for a manual set of adjustments by the operator to minimize the defect. Certain automatic features are provided, such as centering a negative for printing in the printing gate from amongst the several negatives on a roll of negatives, and recording the color component printer information on magnetic tape.

Another proposal for subtractive printing senses insofar as possible the characteristics of the negative and makes normal or supernormal corrections. Capacitors are charged accordingly and the charge on each determines how long an exposure with which subtractive filter shall take place.

Another proposal for examining color transparencies (slides) by an additive color source employs a color cathode-ray tube. The particular transparency is placed upon the face of the tube, upon which an essentially white raster of light is created by a three-gun type embodiment. The electron beam current for each of the guns, red, green and blue, is adjusted until a pleasing rendition of the color subject matter of the transparency is obtained, as determined by the operator. The voltage upon the grid of each gun at this adjustment is a measure of the intensity of each of the primary colors that are then giving an "off-white" raster. This is recorded as the color information for further processing of the transparency. The system is employed particularly for obtaining color separation information for printing a color picture upon paper with color inks.

Another proposal employs an apparatus for measuring the exposure parameters of a negative, a computer for accepting that information, and a plurality of photographic printers for making plural prints from the negative in accordance with the computer information. This system is for black and white photography only.

SUMMARY OF THE INVENTION

Additive color printing is accomplished by controlling the red, green and blue primaries according to preselected values regardless of variations in the parameters of the apparatus involved.

The preselected values may come from those stored in a computer, or from a keyboard type input to the microprocessor of this apparatus.

The remainder of the printer apparatus is connected in a feedback loop. This comprises a comparison amplifier, a controllable pluraloutput power supply, plural primary-color-emitting electric lamps energized by the power supply, plural light-responsive means to monitor the light output of each lamp, and a return connection to the comparison amplifier. The preselected primary color values of light intensity from the microprocessor are also impressed upon the comparison amplifier, and the feedback loop is automatically maintained in adjustment in accordance with those preselected values.

In one embodiment of this invention any variation in the color balance occasioned by the presence of the colors in the negative, a necessary component of the light-integrating entity, and the colored light reflected back therefrom into the light-integrating entity is prevented by the structure and circuits of this invention.

DESCRIPTION OF THE PREFERRED EMBODIMENT

Figure 1:
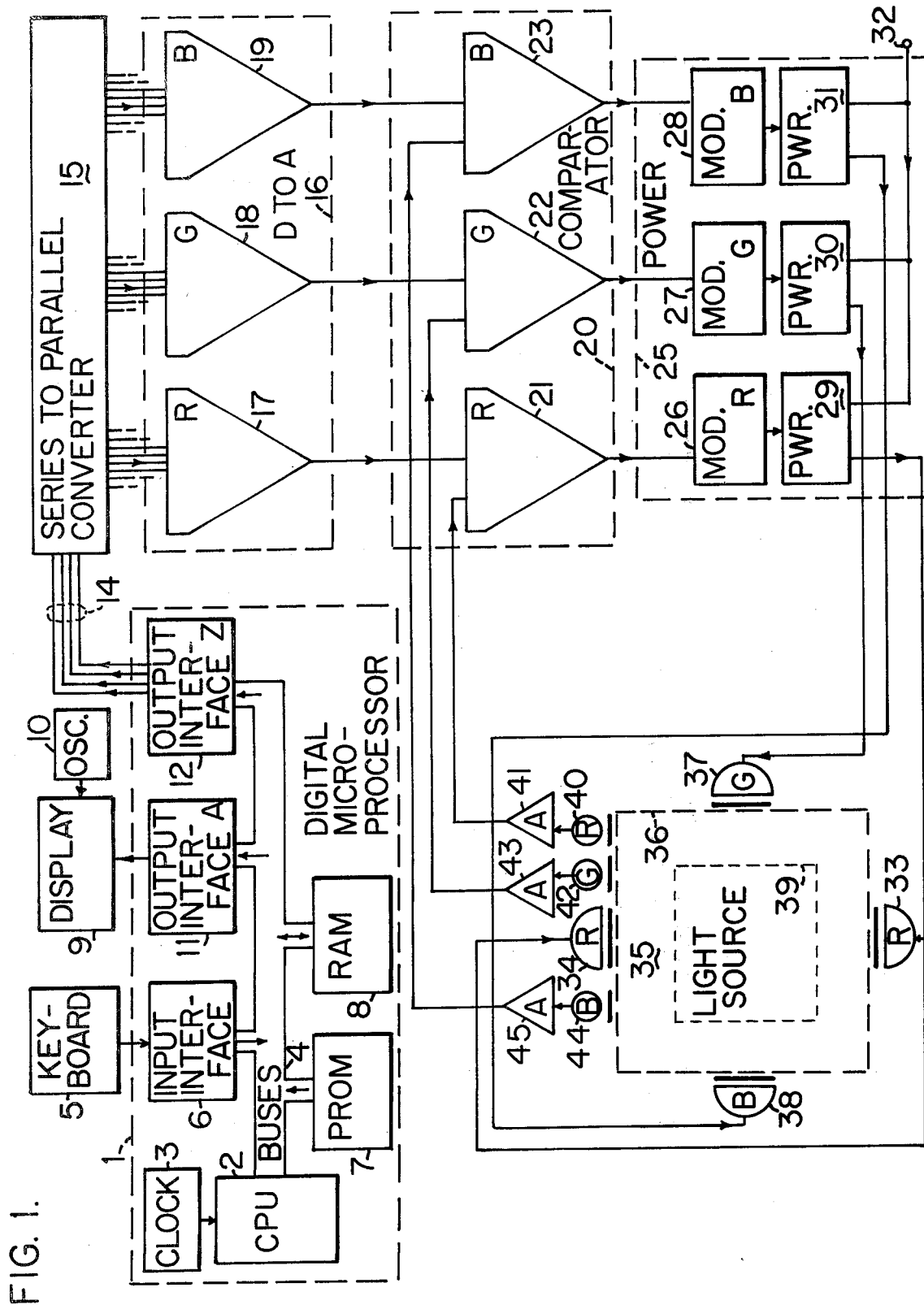
FIG. 1 is a block diagram of the apparatus required for controlling the three primary color components in the light-source - printer.

In FIG. 1 numeral 1 identifies digital microprocessor means that act as an over-all controller for the additive color printer control of this invention.

The microprocessor (means) allows a set of "trim" numbers to be entered first. This conforms the process for a particular printer to an empirical standard within which the color printing numbers information for each individual negative is supplied and then entered to accomplish the printing.

In common with microprocessor practice a central processing unit (CPU) 2 is provided to accomplish over-all processing by the microprocessor. It is activated by clock 3, and conducts processing through buses 4. These buses connect to other significant elements in the microprocessor.

Keyboard 5 is employed by an operator to enter the trim numbers and the color printing numbers for each of the primary colors, red, green and blue. Typically, digits 0 to 9, and functions, "program," "clear," "clear entry" and "enter," are each provided with keys on the keyboard. This information is entered into the microprocessor proper by input interface 6, which also provides matrix energy for scanning the keyboard to determine which key has been pushed by the operator.

Programmable read only memory (PROM) 7 is connected to the CPU via buses 4. The PROM provides essentially permanent information having to do with the functioning of the microprocessor; for example, the operation that guides data acquisition, and main data per se. These are accomplished partially by the main program and partially by subroutines.

Random access memory (RAM) 8 is also connected to buses 4 to provide temporary storage of digital information being processed.

Display 9 is provided so that the operator can see what color printing numbers are in effect at any given time. Typically, these are the numbers that the operator has previously punched-in at the keyboard.

Any type of computer-operable display is useable, but a liquid crystal light-transmissible type is preferred. Then color filters of the gelatin type can be placed behind appropriate display positions.

Normally, 0 to 99 embraces the numerical range required, and so two digits are provided with a red filter, two with a green filter, and two with a blue filter. The specific numeral to be exhibited and the position at which it is to be exhibited are determined according to digital procedure in the microprocessor.

Oscillator 10 is for the purpose of exciting the light-transmissible liquid crystal display 9 so that it will pass illumination when it is also energized according to the desired numeric by the microprocessor. This may be a low-power oscillator operating at a frequency of 1,000 Hertz.

Display 9 is interfaced to the microprocessor by output interface A, 11, which is a part of the microprocessor.

A second output interface Z, 12, connects from buses 4 and conveys a digital output over, say, four conductors 14 to the input of the series to parallel converter 15. Four digital lines are sufficient for a practical embodiment, but more lines may be employed for more involved processing.

The series to parallel converter is required to simultaneously and separately provide on a temporary basis (until new information is supplied) 16 bits of information for each of the red, green and blue channels. This is accomplished by using three groups of registers. These are serially fed by 4 bit digital information and when filled each retains 16 bits pertaining to a primary color.

The illumination required for printing color positives is an amplitude; i.e., analog, type of function that cannot directly utilize digital information. Accordingly, a generic digital to analog converter (D to A), 16, is provided, with a separate conversion circuit element for each of the primary color channels; these being 17, 18, 19.

The desired balance of primary color components in the illumination of the printer of this invention is entered into the microprocessor keyboard. This balance is maintained to and including comparator 20, which has separate circuit elements for each primary color channel; these being 21, 22, 23.

However, the actual balance is maintained by a feedback loop that includes the plural sources of illumination. This is controlled by the amplitude of the desired balance information.

This occurs in comparator 20, within which the actual balance is constantly compared with the balance desired, and the illumination level of each primary source is immediately adjusted to the desired level. This functioning is accomplished despite long term or short term variations in the parameters that affect the illumination.

The electrically-represented control information from the outputs of comparator 20 passes individually into power supply (Power) 25. The power supply has at least three channels to accommodate the three color information levels; such as modulator 26 (Mod. R) for red, modulator 27 for green, and modulator 28 for blue.

The modulators are control elements for the level of electrical energy dispensed to each of the component primary illumination sources. The modulators may be the control elements of regulated power supplies, modulators of pulse width in a switching type power supply, or of similar devices.

Each modulator is connected to a separate power entity (Pwr.), 29, 30, 31, one for each of the several channels, and it is also provided with an electric power input from terminal 32. This input may be the usual alternating current electric power.

The thus regulated electric power from entity 29 is connected to red illumination source 33, also to red illumination source 34. These sources are typically incandescent lamps having red filters in the optical path into integrating chamber 35 of light source 36. It is usual to utilize two lamps for the red source to obtain the desired intensity of that color component. Separate power entities 29 may alternately be provided, under the single control of red comparator 21, for the separate lamps 33 and 34.

The electric power from entity 30 is connected to green illumination source 37, having a green filter; while power from entity 31 is connected to blue source 38, having a blue filter.

Continuing the feedback loop, red illumination sensor 40 views light-integrating chamber 35 through a red filter and passes an electrical response to amplifier 41, the output of which enters red comparator 21 as a second input thereto. The desired correspondence between the computer-selected value of red illumination and what is provided despite practical factors otherwise altering that value is thus achieved, as has been previously pointed out.

The green illumination feedback is similarly accomplished from sensor 42 and amplifier 43 to green comparator 22; also the blue feedback from sensor 44 and amplifier 45 to blue comparator 23.

It will be understood that color transparency 39, to be printed, is typically supported upon the top of integrating chamber 35, and that an image thereof is formed by lens means onto unexposed positive print paper in the known manner of color printers.

Figure 2:
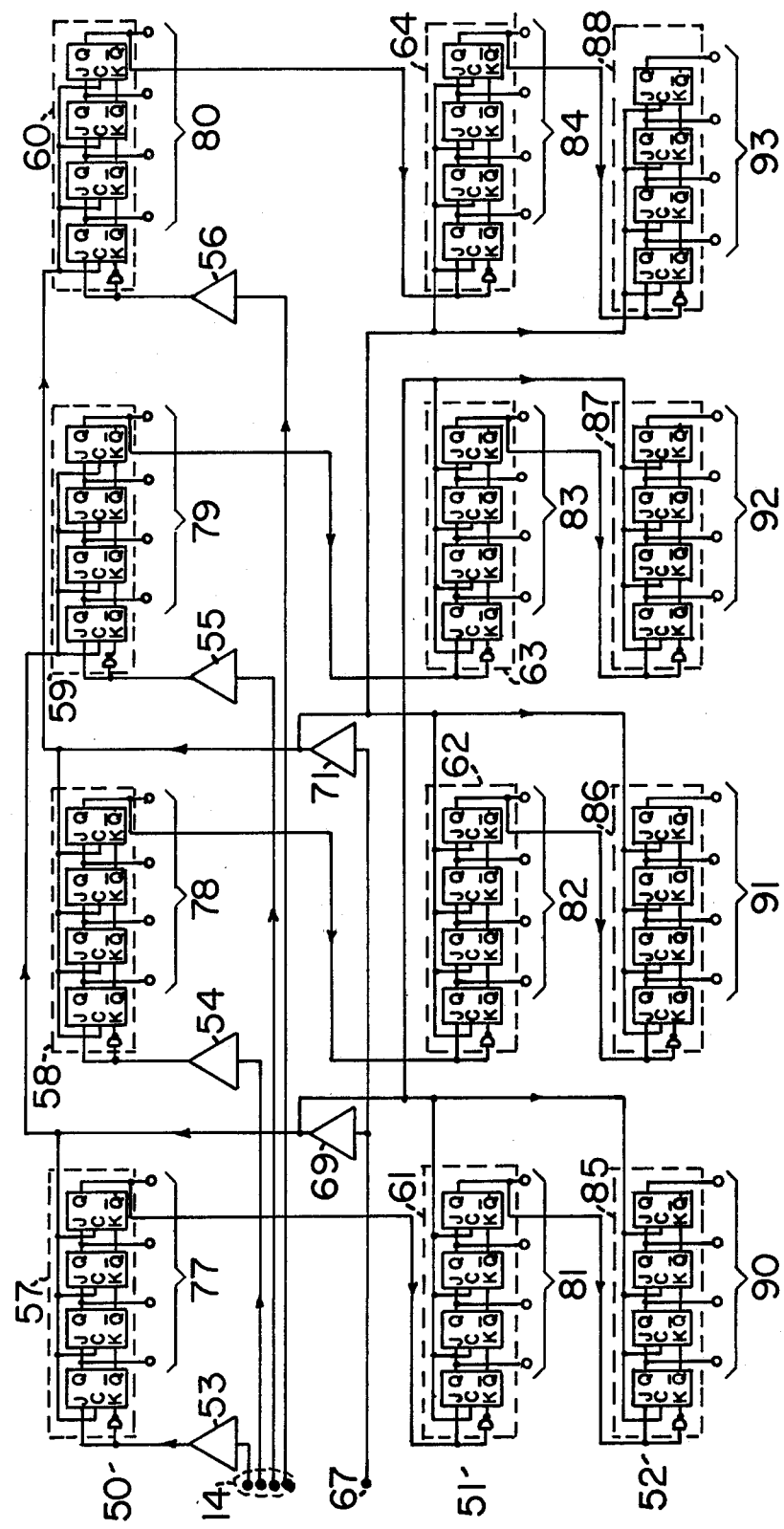
FIG. 2 is a simplified schematic diagram of the series to parallel converter device of FIG. 1.

The circuit of the series to parallel converter 15 is shown in FIG. 2.

The principal circuit elements are shift registers. These may be conveniently embodied in integrated circuits (ICs).

In order to accomplish the functioning required, three groups of four shift registers each are provided. Each one may be a type 9300 integrated circuit. The whole groups are identified by numerals 50, 51, 52, in order. When all groups are filled with color information, these are the red, green and blue groups, respectively.

Incoming digital data line 14 is shown in both FIGS. 1 and 2. In FIG. 2, one of the four lines enters one of the four registers in the first group 50 through interface buffer 53. Another of the four lines enters another of the four registers, being 58, through interface buffer 54. Similarly, another line enters register 59 through buffer 55, and the last line enters register 60 through buffer 56. The first register is 57. The interface buffers may be upon a 7407 chip.

The output of each interface buffer enters the first terminal of each shift register. The data progresses through each shift register upon receiving a clock pulse from the main clock 3 of the microprocessor.

Microprocessor 1 is programmed to output the blue color digital information first, the green next, and the red last. Since the information travels serially through converter 15, during the relatively short interval when the loading of the converter is taking place, the red register 50 first has blue information in it. The printer is not operated at this time, thus there is no malfunctioning.

The last output terminal of each of the red registers 57 through 60 connects to the input of each of the green registers 61 through 64. When the green color digital information is outputted from the microprocessor the blue information begins to occupy green register 51, as a whole.

Terminal 67 in FIG. 2 receives an input from clock 3 of FIG. 1. These clock pulses pass through buffer-drivers 69 and 71 and then enter the clock pulse input "C" of all shift registers; i.e., 57–60, 61–64, and 85–88. These pulses shift the information through the registers.

In each of the four registers of the overall red register 50 the four groups of output terminals of four each, 77, 78, 79, 80, provide the constantly available color component information, 16 bits in all, as soon as the whole shift register 50 has been loaded with red color component information.

Similarly, the four output terminal groups 81, 82, 83, 84 of the green whole register 51 provide the constantly available color component information, 16 bits in all, as soon as this register has been loaded with green information.

The same structure is repeated, with output terminal groups 90, 91, 92, 93 of the blue whole register 52, and the blue information is constantly available, 16 bits, as soon as this register has been loaded with blue information.

Referring to FIG. 1 to provide further aspects of circuit structure, the total of 16 bits of digital information from output terminal groups 77 through 80 enter the red digital to analog converter 17. This is typically a binary coded decimal IC module, type CY2735, or equivalent.

The same structure is repeated for the green digital to analog converter 18, and for the blue converter 19.

As has been previously set forth, each digital to analog converter feeds one input to corresponding color component comparators 21, 22, 23. These may each be a 741DM chip, accepting two inputs and providing one input.

The optical and related structure of light source 35 is detailed in a copending patent application, Ser. No. 703,735, filed July 9, 1976, entitled "Additive Color Printing Method and Apparatus," of which the present inventor was a co-inventor.

I claim:

1. The method of additive color printing control which includes the method steps of;
   a. originating electrically represented plural component digital color information corresponding to a given color transparency,
   b. converting said digital color information into plural corresponding simultaneously and continuously existing electrical amplitudes, and
   c. continuously and simultaneously controlling plural sources of color component integrated continuous printing illumination intensity in accordance with said electrical amplitudes.

2. An additive color printer control, comprising;
   a. digital microprocessor means (1) for accepting electrically represented components of color information corresponding to a given color transparency (39),
   b. a series to parallel converter (15) connected to said microprocessor means to temporarily, simultaneously and separately retain said plural components of color information,
   c. plural digital to analog converters (16) connected to said series to parallel converter to simultaneously accept said plural components of color information and to form separate electrical amplitudes corresponding to said components,
   d. an electrical amplitude comparator (20) connected to each said digital to analog converter, and
   e. a feedback circuit (25, 35, 40, 42, 44, 20) including plural illumination means for color printing also individually connected to each said comparator,
   whereby each of said plural illumination means is energized according to said plural components of color information provided by said microprocessor means.

3. The control of claim 2, in which said series to parallel converter comprises;
   a. a first group of plural registers (50) digitally connected to said digital microprocessor means,
   b. a second group of plural registers (51) digitally connected to said first group, and
   c. a third group of plural registers (52) digitally connected to said second group,
   whereby plural components of color information are simultaneously retained.

4. The control of claim 3, in which;
   a. there are four shift registers (57–60, 61–64, 85–88) in each said group of plural registers, and
   b. the digital connection between said first, second and third groups effects a progression of said plural components of color information from said first to said second, and from said second to said third groups of plural registers,
   whereby, upon all of said first, second and third registers being filled with components of color information said information is then separately continuously available for each of three components of color information.

5. The control of claim 2, in which said microprocessor means also includes;
   a. a keyboard (5) to enter color-related numeric information into said microprocessor means, and
   b. a display (9) to reproduce the color-related information that has been entered into said microprocessor means.

6. The control of claim 2, in which said electrical amplitude comparator (20) comprises;
   a. a differential amplifier having two inputs for accepting inputs from said digital to analog converter (16) and from said feedback circuit, and
   b. an output having a median electrical amplitude which varies the response of the feedback circuit to maintain that response equivalent to the input from the digital to analog converter.

* * * * *